(12) United States Patent
Kimura (10) Patent No.: US 8,255,657 B2
(45) Date of Patent: Aug. 28, 2012

(54) DIGITAL BROADCASTING CONTENTS MOVE FUNCTION

(75) Inventor: Yoji Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/209,578

(22) Filed: Sep. 12, 2008

(65) Prior Publication Data
US 2009/0013142 A1    Jan. 8, 2009

Related U.S. Application Data (63) Continuation of application No. PCT/JP2006/304876, filed on Mar. 13, 2006.

(51) Int. Cl.
G06F 12/00 (2006.01)
(52) U.S. Cl. ........ 711/165; 711/154; 711/161; 711/162; 711/163; 711/164
(58) Field of Classification Search .................. 711/154, 711/161, 162, 163, 164, 165
See application file for complete search history.

(56) References Cited

U.S. PATENT DOCUMENTS

| 6,615,192 | B1 | 9/2003 | Tagawa et al. | |
|---|---|---|---|---|
| 2002/0147821 | A1 | 10/2002 | Ebihara et al. | |
| 2005/0159972 | A1 | 7/2005 | Harada et al. | |
| 2008/0091900 | A1* | 4/2008 | Imai et al. | 711/163 |

FOREIGN PATENT DOCUMENTS

| EP | 0809244 A2 | 11/1997 |
|---|---|---|
| EP | 0984346 A1 | 3/2000 |
| EP | 1288942 A1 | 3/2003 |
| JP | 2000-357370 | 12/2000 |
| JP | 2004-248260 | 9/2004 |
| JP | 2005-202935 | 7/2005 |
| JP | 2005-250567 | 9/2005 |
| WO | WO-01/67668 A1 | 9/2001 |

OTHER PUBLICATIONS

Wikipedia, "Transaction processing," Feb. 16, 2006, URL:http://en.wikipedia.org/w/index.php?title=Transaction_processing&oldid=39935593 [retrieved from the internet on Jan. 25, 2012], 1 page.
Extended European Search Report dated Feb. 3, 2012 for corresponding European Application No. 06715599.4.
International Search Report PCT/JP2006/304876, mailed Oct. 3, 2006.

* cited by examiner

Primary Examiner — Midys Rojas
(74) Attorney, Agent, or Firm — Fujitsu Patent Center (57) ABSTRACT

To provide a move function that can restore copy-once contents even if the contents are failed to be moved midway, an information storage device 10 comprises data moving unit 14 for making program data 12 stored on a first storage medium 11 unreproducible and for moving the program data 12 to a second storage medium 13, abnormality detecting unit 15 for monitoring an abnormal termination of the data moving unit 14, storage medium verifying unit 16 for verifying whether or not the second storage medium 13 is the same as the second storage medium 13 used when the abnormality detecting unit 15 detects the abnormal termination of the data moving unit 14, medium initializing unit 17 for initializing the second storage medium 13, and reactivating unit 18 for making the program data 12, which is made unreproducible by the data moving unit 14, reproducible.

10 Claims, 8 Drawing Sheets

DIGITAL BROADCASTING CONTENTS MOVE FUNCTION

CROSS REFERENCE TO RELATED APPLICATION

This application is a continuation of PCT application of PCT/JP2006/304876, which was filed on Mar. 13, 2006.

BACKGROUND OF THE INVENTION

1. Field of the Invention

The present invention relates to a function to move digital broadcasting contents stored on a first storage medium to a second storage medium.

2. Description of the Related Art

In recent years, digital broadcasting has been delivered by using a special copy guard technique such as a copy-once technique in order to protect the copyright of a program provided by the digital broadcasting.

A copy-once program is allowed to be recorded only once in order to prevent an illegal copy. Additionally, only one program recorded to be viewable is allowed to exist.

Accordingly, for example, when a copy-once program that is recorded in an HDD (Hard Disk Drive) is moved to a DVD (Digital Versatile Disk), the program recorded in the HDD is erased. This is called a move function from an HDD to a DVD.

However, a process for moving, for example, from an HDD to a DVD is sometimes failed midway due to problems such as a problem of the quality of a storage medium such as an HDD, a DVD, etc. In this case, the recorded program remains neither in the HDD nor on the DVD. Namely, the recorded program is erased, leading to a significant inconvenience of a user.

Figure 1:
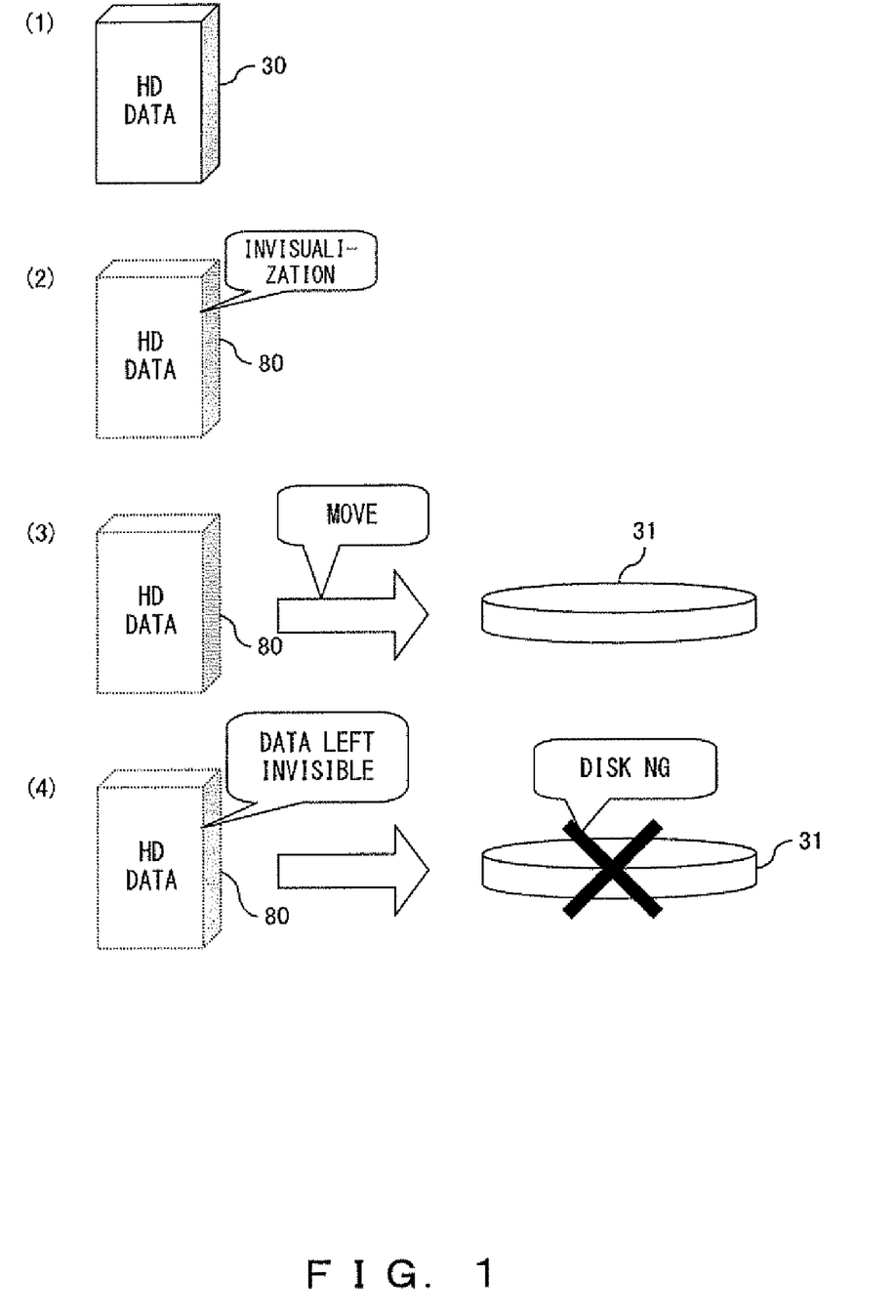
FIG. 1 is a schematic diagram for explaining a conventional example of a move process.

FIG. 1 is a schematic diagram for explaining a conventional example of the move process. HD data 30 indicates data of a copy-once program stored in an HDD not shown. A DVD 31 indicates a DVD for recording, which is compliant with CPRM (Content Protection for Recordable Media).

(1) Upon receipt of a copy-once program from digital broadcasting, an information storage device stores (records) the received program in the HDD not shown as the HD data 30.

(2) When starting the move process from the HDD to the DVD, the information storage device rewrites a predetermined management table stored in the HDD, and notifies firmware for controlling hardware such the HDD, etc. to invisualize the HD data 30 (to make the HD data 30 unreproducible).

(3) Upon completion of invisualizing the HD data 30, the information storage device starts to move the HD data 30 from the HDD to the DVD.

(4) If a problem of the quality of hardware or the DVD occurs while the HD data 30 is being moved from the HDD to the DVD, the data of the program recorded in the HDD is left invisible. Additionally, since the data stored on the DVD becomes incomplete, the data of both the HDD and the DVD are lost.

The reason is that the data of the invisualized recorded program cannot be activated because it cannot be determined that the inserted DVD is the same as a DVD used when the move process is failed.

Patent Document 1 discloses the recording replaying device and the recording replaying controlling method, which are intended to facilitate an operation for moving a recorded program from a hard disk to an insertable/removable storage medium.

Patent Document 1: Japanese Published Unexamined Patent Application No. 2004-248260

SUMMARY OF THE INVENTION

The present invention was developed in light of the above described problem, and an object thereof is to provide a move function that can restore copy-once contents even if the contents are failed to be moved midway.

To solve the above described problem, an information storage device according to the present invention is an information storage device that can move program data stored on a first storage medium to a second storage medium, and comprises data moving unit for moving the program data from the first storage medium to the second storage medium after making the program data unreproducible, abnormality detecting unit for detecting an abnormal termination of the data moving unit, storage medium verifying unit for verifying whether or not the second storage medium is the same as the second storage medium used when an abnormal termination is detected upon detection of the abnormal termination of the data moving unit by the abnormality detecting unit, medium initializing unit for initializing the second storage medium if the storage medium verifying unit determines that the second storage medium is the same as the second storage medium used when the abnormal termination is detected, and reactivating unit for making the program data reproducible upon completion of initializing the second storage medium by the medium initializing unit.

According to the present invention, the abnormality detecting unit detects an abnormal termination if the data moving unit abnormally terminates. Then, the storage medium verifying unit checks whether or not the second storage medium is the same as the second storage medium used when the abnormal termination is detected. If the second storage medium is the same, the medium initializing unit initializes the second storage medium. This can guarantee that only one piece of reproducible program data exists even if the program data stored on the first storage medium is made reproducible. Accordingly, the program data stored on the first storage medium can be restored.

As described above, the present invention can provide the move function that can restore copy-once contents even if the contents are failed to be moved midway.

DESCRIPTION OF THE PREFERRED EMBODIMENTS

A preferred embodiment according to the present invention is described below with reference to FIGS. 2 to 8.

Figure 2:
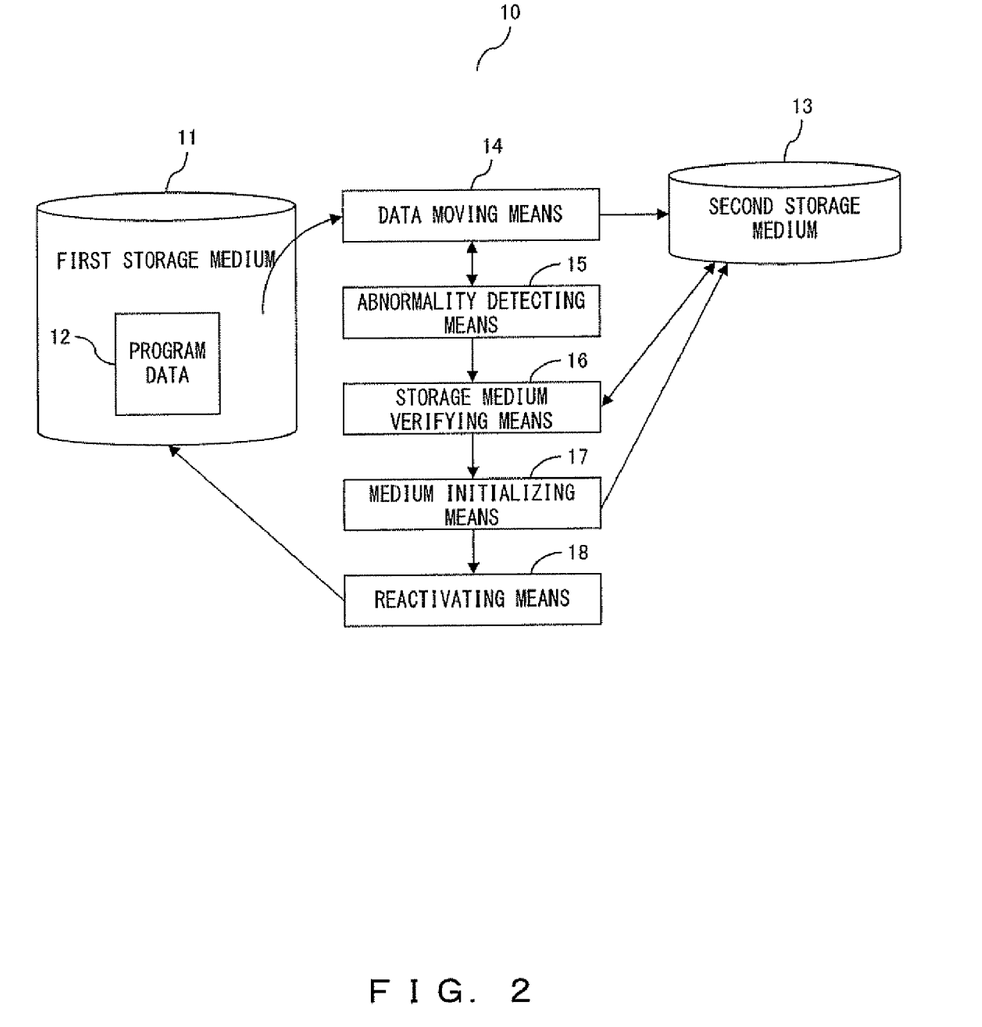
FIG. 2 is a schematic diagram for explaining the principle of the present invention.

FIG. 2 is a schematic diagram for explaining the principle of the present invention.

An information storage device 10 for carrying out a data moving method according to the present invention comprises a data moving unit 14 for making program data 12 stored on a first storage medium 11 unreproducible and for moving the program data 12 to a second storage medium 13, an abnormality detecting unit 15 for monitoring an abnormal termination of the data moving unit 14, a storage medium verifying unit 16 for verifying whether or not the second storage medium 13 is the same as a second storage medium 13 used when the abnormality detecting unit 15 detects the abnormal termination of the data moving unit 14, a medium initializing unit 17 for initializing the second storage medium 13, and a reactivating unit 18 for making the program data 12, which is made unreproducible by the data moving unit 14, reproducible.

The data moving unit 14 is unit for moving arbitrary program data 12 stored on the first storage medium 11 to the second storage medium 13. This unit makes the program data 12 unreproducible before moving the program data 12 (this process is hereinafter referred to as "invisualization", and invisualized data is referred to as "invisualized data").

The abnormality detecting unit 15 detects an abnormal termination by monitoring the move process of the program data 12, which is executed by the data moving unit 14.

When the abnormality detecting unit 15 detects an abnormal termination, the storage medium verifying unit 16 verifies whether or not the second storage medium 13 is the same as that (hereinafter referred to as an "abnormal-time medium") used when the abnormality detecting unit 15 detects the abnormal termination.

The initializing unit 17 initializes the second storage medium 13 if the storage medium verifying unit 16 verifies that the second storage medium 13 is the abnormal-time medium.

The reactivating unit 18 makes the invisualized data reproducible as program data (this process is hereinafter referred to as "reactivation") upon completion of initializing the second storage medium 13 by the medium initializing unit 17.

Here, for example, storage media such as an HDD, a DVD-RAM, a DVD-RW, a DVD-R, a DVD+R, an HD DVD, a blue-ray disk, etc. are available as the first and the second storage media 11.

The program data 12 is data that is allowed to be copied only once between storage media, and data obtained by receiving contents sent by digital broadcasting, and by storing the contents on the first or the second storage medium, or data that is obtained via the Internet, etc., and stored on the first or the second storage medium.

Figure 3:
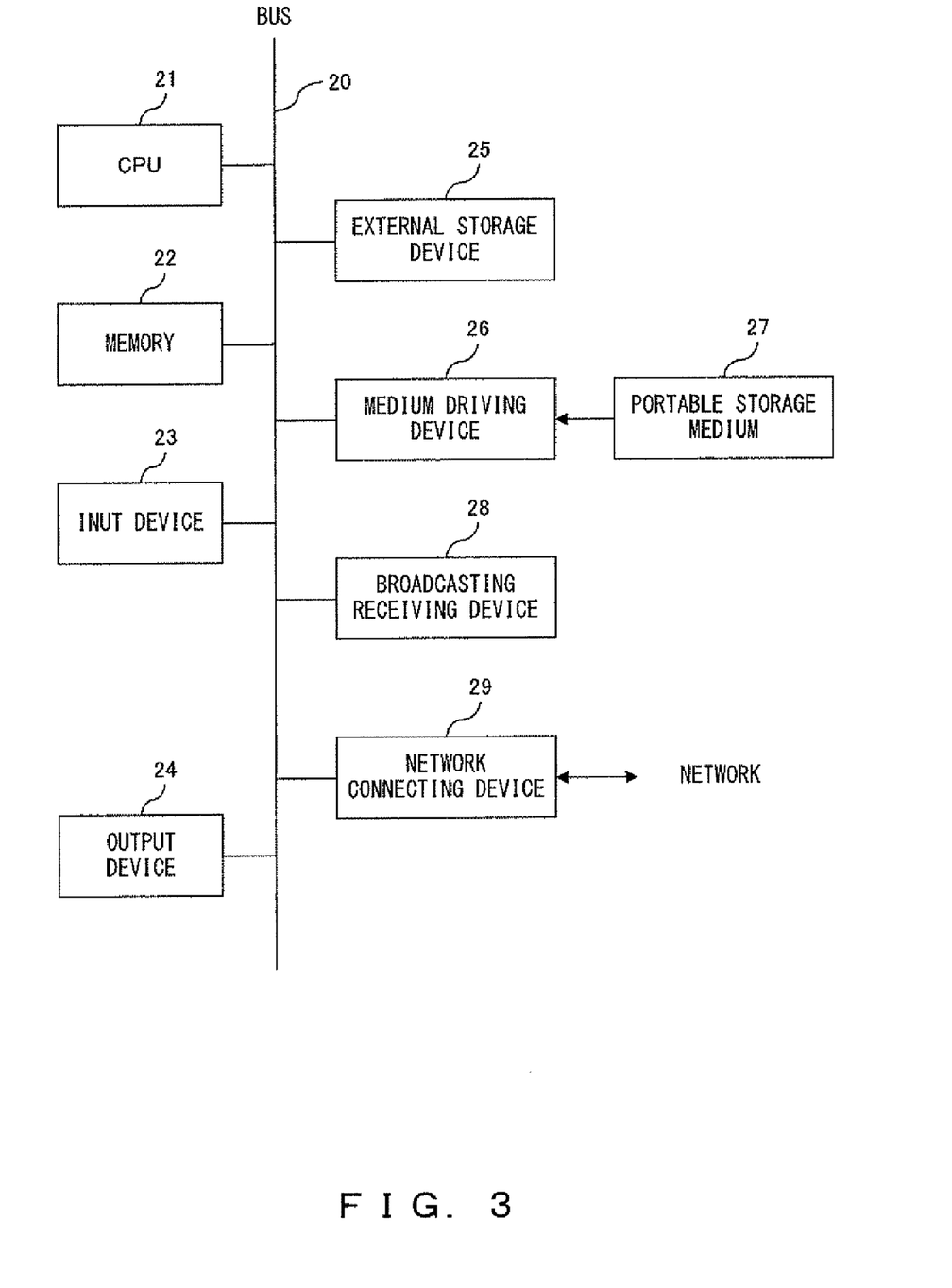
FIG. 3 is a schematic diagram showing an example of a configuration for carrying out an information storage device according to a preferred embodiment of the present invention.

FIG. 3 is a schematic diagram showing an example of a configuration for carrying out the information storage device according to the preferred embodiment of the present invention.

The information storage device 10 shown in FIG. 3 comprises a CPU 21 not only for controlling peripheral devices or for executing various types of software but also for executing a program for carrying out the data moving method according to this preferred embodiment, a volatile memory 22 (such as a RAM) used to execute the program, an input device 23 (such as a keyboard or a mouse) that is unit for externally inputting data, an output device 24 for displaying data, etc., an external storage device 25 (such as an HDD or a RAID) for storing a program for carrying out the data moving method according to this preferred embodiment, and the program data 12 in addition to a program and data that the information storage device 10 requires to operate, a medium driving device 26 for outputting data of the memory 22 or the external storage device 25 to a portable storage medium 27 (such as a DVD-RAM, a DVD-RW, a DVD-R, a DVD+R, an HD DVD, a blue-ray disk, a CD-R, a CD+R, a CD-RW, etc.) or for reading data stored on the portable storage medium 27, and a broadcasting receiving device 28 for receiving contents sent by digital broadcasting. These devices are connected to a bus 20 so that they can mutually send/receive data.

The external storage device 25 and the medium driving device 26 may be connected to the information storage device 10 via a network.

The information storage device 10 shown in FIG. 3 further comprises a network connecting device 29 for making a connection to a network such as the Internet, etc.

Contents received by the broadcasting receiving device 28 are stored in the external storage device 25 as the program data 12. Also contents that are delivered via the network and received with the network connecting device 29 are stored as the program data 12 in the external storage device 25.

In the above described configuration, the CPU 21 is made to execute the program stored in the external storage device 25, etc., whereby the data moving unit 14, the abnormality detecting unit 15, the storage medium verifying unit 16, the medium initializing unit 17, and the reactivating unit 18, which are shown in FIG. 2, are carried out.

The first and the second storage media 11 are implemented by the external storage device 25 or the portable storage medium 27.

Figure 4:
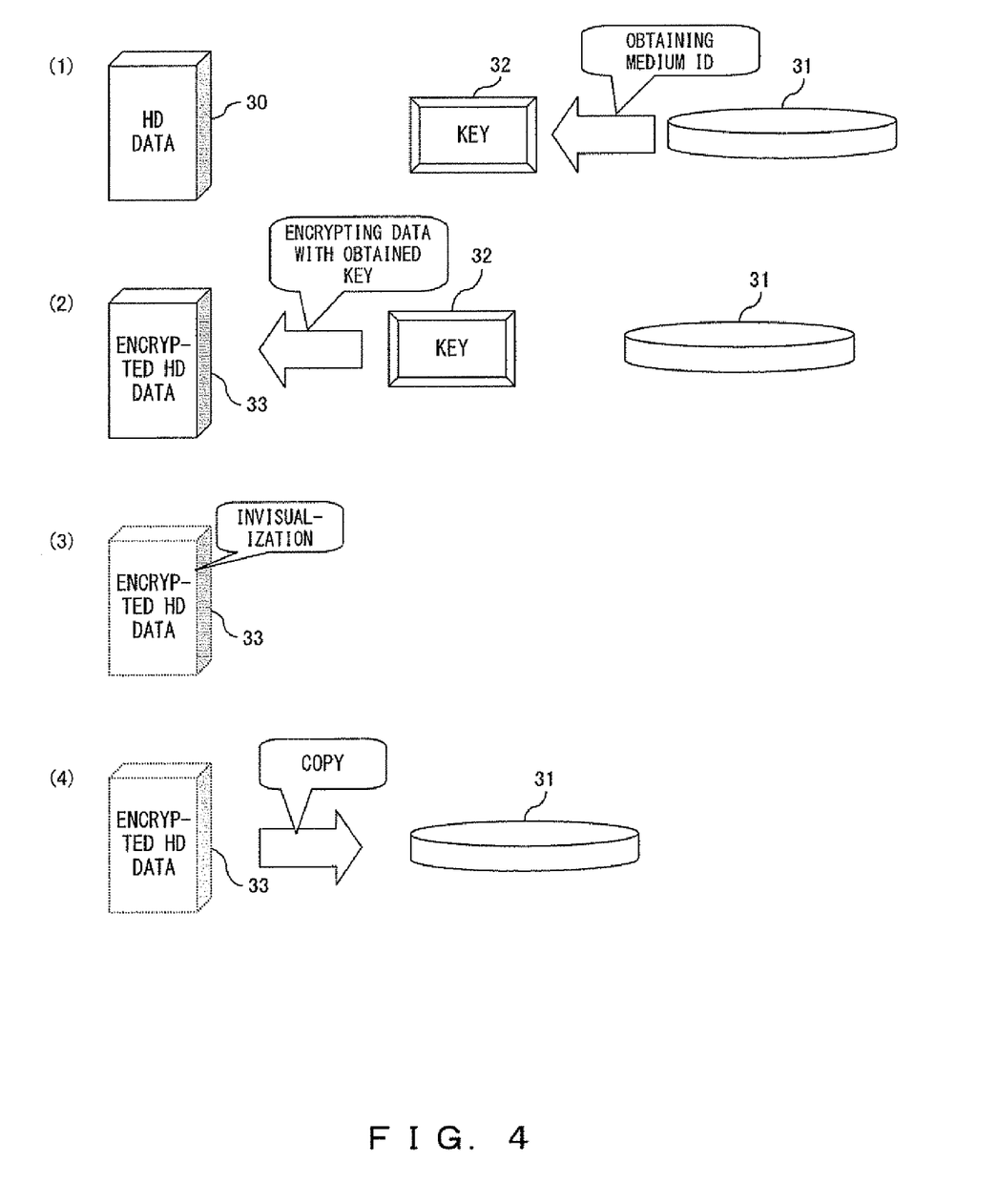
FIG. 4 is a schematic diagram showing the outline of a move process executed by the information storage device according to the preferred embodiment.
Figure 5:
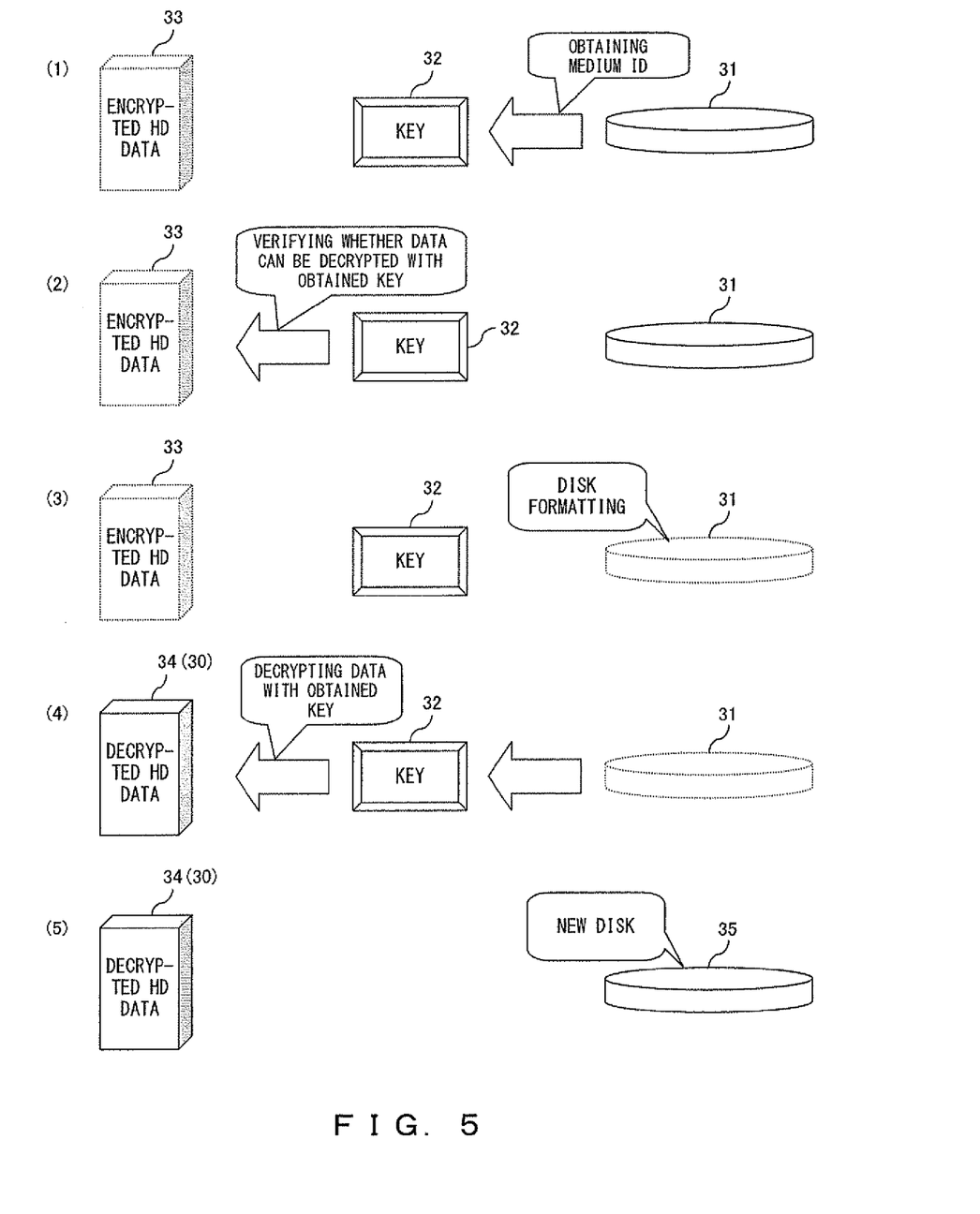
FIG. 5 is a schematic diagram showing the outline of a recovery process executed by the information storage device according to the preferred embodiment.
Figure 6:
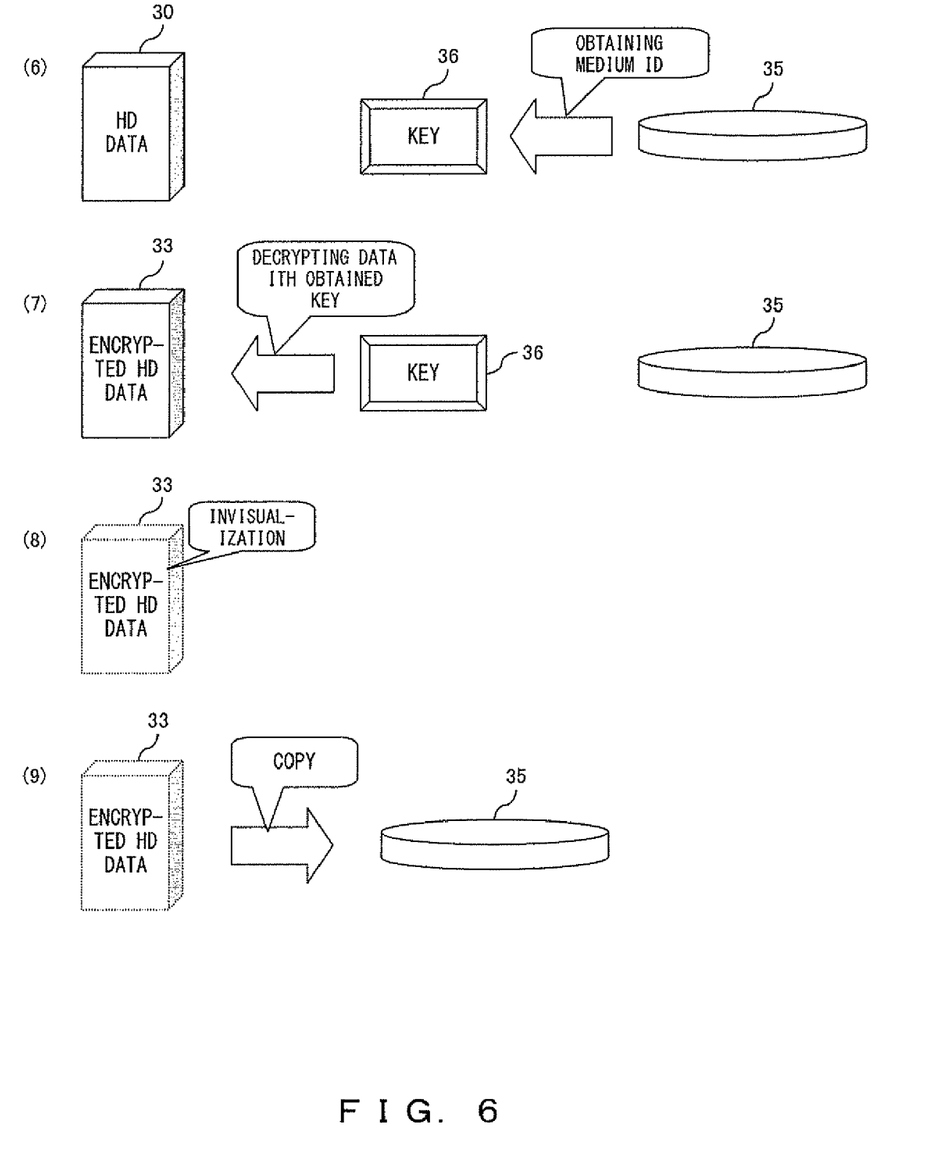
FIG. 6 is a schematic diagram showing the outline of a recovery process executed by the information storage device according to the preferred embodiment.

The overview of the information storage device 10 according to this preferred embodiment is shown in FIGS. 4 to 6.

FIG. 4 is a schematic diagram showing the move process executed by the information storage device 10 according to this preferred embodiment.

HD data 30 indicates program data 12 stored in an HDD not shown. A DVD 31 indicates a DVD for recording, which is compliant with CPRM (hereinafter referred to simply as "DVD").

(1) The information storage device 10 obtains a medium ID from the DVD 31 when starting the move process. Then, the information storage device 10 uses the medium ID as a key 32 to the following encryption process.

(2) Upon obtaining the key 32, the information storage device 10 encrypts the HD data 30 with the key 32. The encrypted HD data 30 is referred to as encrypted HD data 33. Since generally known methods may be used for encryption/decryption, their detailed explanations are omitted.

(3) Upon completion of encrypting the HD data 30, the information storage device 10 invisualizes the encrypted HD data 33.

(4) Upon completion of invisualizing the encrypted HD data 33, the information storage device 10 copies the encrypted HD data to the DVD 31 while decrypting the data with the key 31. Additionally, the information storage device 10 makes the HD data 30 copied to the DVD 31 reproducible, and terminates the process.

FIGS. 5 and 6 are schematic diagrams showing processes executed when the move process shown in FIG. 4 is terminated abnormally. The abnormal termination of the move process can be detected, for example, by an interrupt signal.

If the move process is abnormally terminated due to an occurrence of a medium error, etc. during the move process shown in FIG. 4, the information storage device 10 verifies whether or not the DVD 31 is an abnormal-time medium.

(1) Initially, the information storage device 10 obtains a medium ID from the DVD 31. Then, the information storage device 10 uses the medium ID as a key 32 to the following decryption process.

(2) Upon obtaining the key 32, the information storage device 10 verifies whether or not the encrypted HD data 33 can be decrypted with the key 32. At this time, the information storage device 10 may make a verification by decrypting the whole or part of the encrypted HD data 33. If the information storage device 10 can verify that the encrypted HD dada 33 can be decrypted with the key 32, it determines that the DVD 31 is the abnormal-time medium.

(3) If the DVD 31 is verified to be the abnormal-time medium with the processes of (1) and (2), the information storage device 10 initializes the DVD 31.

(4) Upon completion of initializing the DVD 31, the information storage device 10 decrypts the encrypted HD data 33 with the key 32 obtained with the process of (1), and generates decrypted HD data 34. Then, the information storage device 10 makes the generated decrypted HD data 34 reproducible. Namely, the information storage device 10 restores the HD data 30 from the encrypted HD data 33. Then, the information storage device 10 deletes the encrypted HD data from the HDD.

(5) Upon completion of restoring the HD data 30, the information storage device 10 displays on the output device 24 a message for prompting a user to replace the disk, and causes the user to replace the DVD 31 as the abnormal-time medium with a new DVD 35.

(6) Upon completion of replacing the disk (DVD), the information storage device 10 obtains a medium ID from the DVD 35. Then, the information storage device 10 uses the medium ID as a key 36 to the following encryption process.

(7) Upon obtaining the key 36, the information storage device 10 generates encrypted HD data 33 by encrypting the HD data 30 with the key 36.

(8) Upon completion of encrypting the HD data 30, the information storage device 10 invisualizes the encrypted HD data 33.

(9) Upon completion of invisualizing the encrypted HD data 33, the information storage device 10 copies the encrypted HD data 33 to the DVD 35 while decrypting the encrypted HD data 33 with the key 36. Then, the information storage device 10 makes the HD data 30 copied to the DVD 35 reproducible, and terminates the process.

Figure 7:
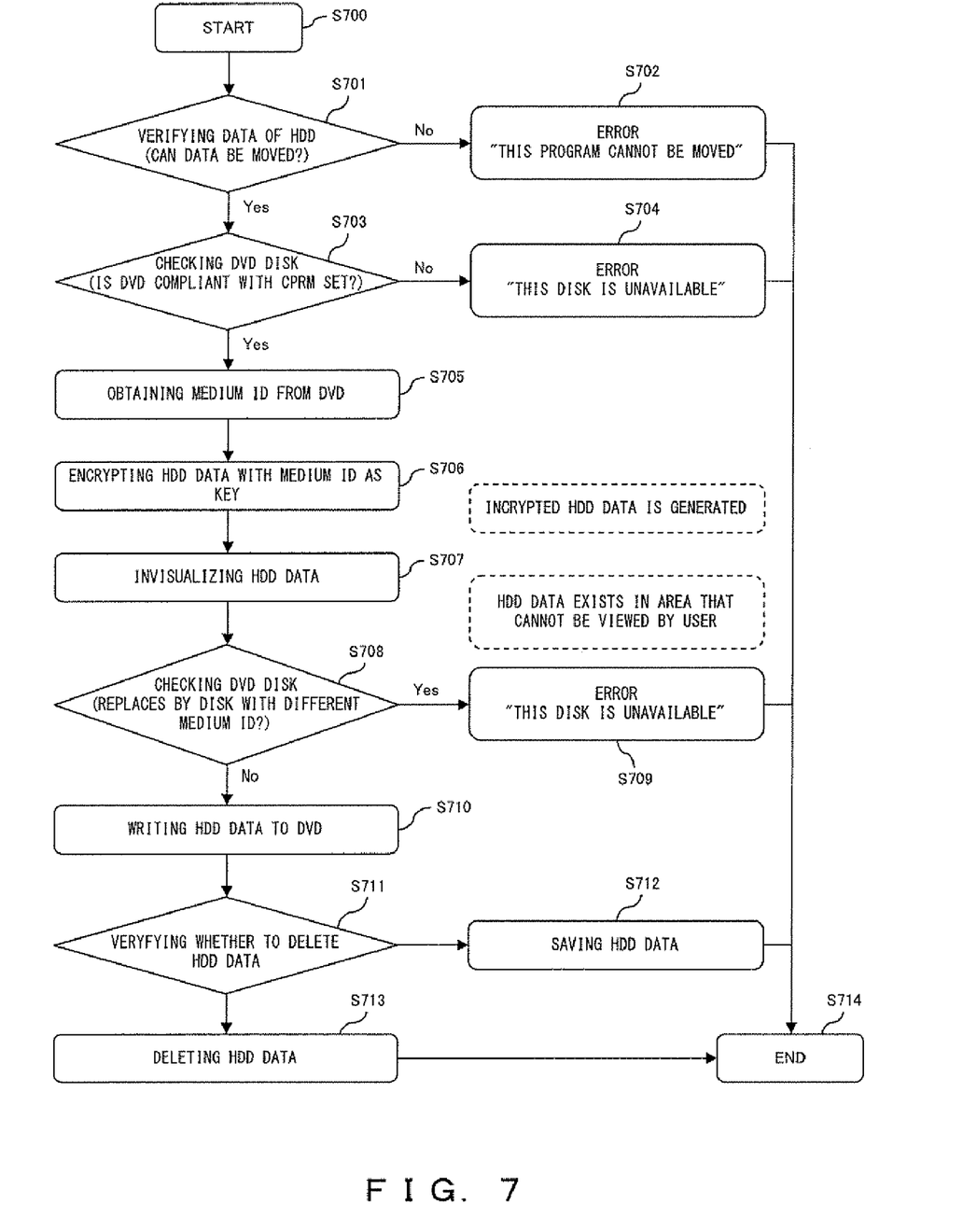
FIG. 7 is a flowchart showing the details of the move process executed by the information storage device according to the preferred embodiment.
Figure 8:
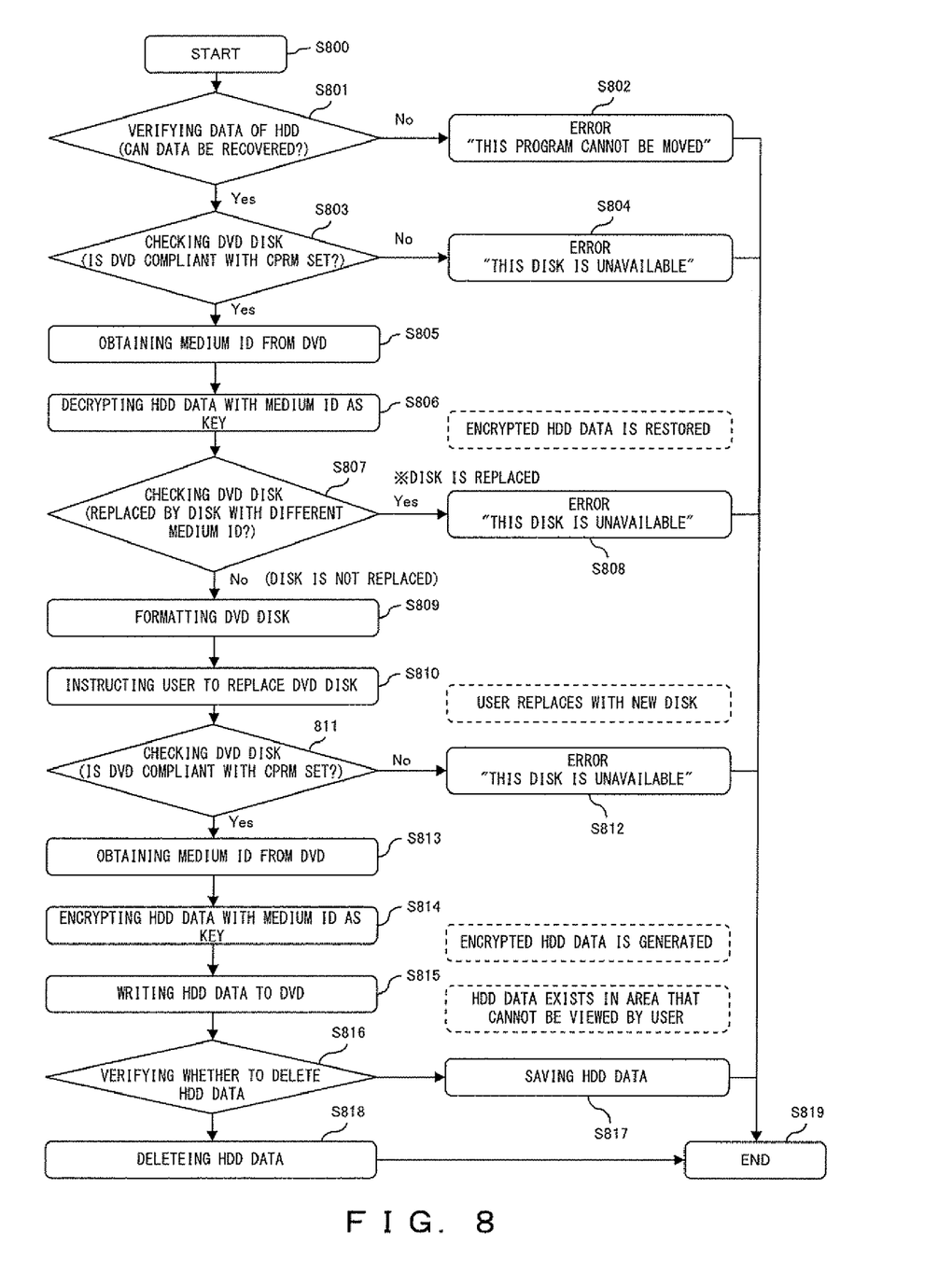
FIG. 8 is a flowchart showing the details of the recovery process executed by the information storage device according to the preferred embodiment.

Details of the above described move and recovery processes executed by the information storage device 10 are shown in FIGS. 7 and 8.

FIG. 7 is a flowchart showing the details of the move process executed by the information storage device 10 according to this preferred embodiment.

When a user specifies his or her desired program data 12 by operating the input device 23 and instructs the information storage device 10 to start the move process, the information storage device 10 starts the move process (step S700).

In step S701, the information storage device 10 verifies whether or not the program data specified in step S700 can be moved. Here, the information storage device 10 verifies the legality of the program data 12. The information storage device 10 verifies, for example, that the specified program data 12 is not data for which the move process has been already executed. If the program data 12 is data for which the move process has been already executed, the information storage device 10 determines that the program data 12 cannot be moved, and advances the process to step S702.

Alternatively, if the information storage device 10 verifies the legality such that the move process has not been executed yet for the program data 12, it determines that the program data 12 can be moved, and advances the process to step S703.

In step S702, the information storage device 10 displays on the output device 24 a message such that this program cannot be moved. Then, the information storage device 10 advances the process to step S714, and terminates the move process.

In step S703, the information storage device 10 verifies whether or not a DVD is set in the medium driving device 26. The information storage device 10 also verifies whether or not the set DVD is a DVD compliant with CPRM.

If the DVD is not compliant with CPRM, the information storage device 10 advances the process to step S704. If the DVD is compliant with CPRM, the information storage device 10 advances the process to step S705.

In step S704, the information storage device 10 displays on the output device 24 a message such that this disk is unavailable. Then, the information storage device 10 advances the process to step S714, and terminates the move process.

In step S705, the information storage device 10 obtains a medium ID from a BCA (Burst Cutting Area) of the DVD. Then, in step S706, the information storage device 10 generates encrypted HD data 33 by encrypting the program data 12 specified in step S700 with the use of the medium ID as a key. Upon completion of generating the encrypted HD data 33, the program data 12 stored in the HDD is deleted.

Upon completion of encrypting the program data 12, the information storage device 10 advances the process to step S707. Then, the information storage device 10 invisualizes the encrypted HD data 33 generated in step S706. To invisualize the encrypted HD data 33, the information storage device 10, for example, rewrites a management table (a flag for controlling an area where the encrypted HD data 33 is stored) of the HDD to unavailable, and notifies the firmware for managing hardware such as the HDD, etc. that the encrypted HD data 33 becomes unavailable.

Upon completion of invisualizing the encrypted HD data 33, the information storage device 10 advances the process to step S708, and checks the sameness of the DVD. Namely, the information storage device 10 verifies whether or not the DVD currently set in the medium driving device is the same as the DVD with the medium ID obtained in step S705.

The sameness of the DVD may be checked, for example, as follows.

Initially, a medium ID is obtained from the DVD currently set in the medium driving device 26. Then, whether or not the encrypted HD data 33 (or part of the encrypted HD data 33) can be decrypted with the use of the medium ID as a key is verified. If the encrypted HD data 33 can be decrypted, the DVD currently set in the medium driving device 26 is determined to be the same as the DVD with the medium ID obtained in step S705. If the encrypted HD data 33 cannot be decrypted, the DVD currently set in the medium driving device 26 is determined not to be the same as the DVD with the medium ID obtained in step S705.

If the DVD currently set in the medium driving device 26 is determined not to be the same as the DVD with the medium ID obtained in step S705 in step S708, the information storage device 10 advances the process to step S709. Then, the information storage device 10 displays on the output device 24 a message such that this disk is unavailable, and terminates the process (step S714).

Alternatively, if the DVD currently set in the medium driving device 26 is determined to be the same as the DVD with the medium ID obtained in step S705 in step S708, the information storage device 10 advances the process to step S710. Then, the information storage device 10 writes the encrypted HD data 33 stored in the HDD to the DVD.

Upon completion of writing the encrypted HD data 33 to the DVD, the information storage device 10 advances the process to step S711.

In step S711, the information storage device 10 verifies whether or not a setting for saving the encrypted HD data 33 stored in the HDD is made, for example, by referencing the memory 22, etc. If the setting for saving the encrypted HD data 33 is made, the information storage device 10 advances the process to step S712, saves the encrypted HD data 33 in a predetermined area (an area that a user cannot operate) of the HDD, and terminates the process (step S714). The encrypted HD data 33 is saved for the recovery process that can possibly occur.

Alternatively, if the setting for saving the encrypted HD data 33 is not made, the information storage device 10 advances the process to step S713, deletes the encrypted HD data 33 from the HDD, and terminates the process (step S714).

FIG. 8 is a flowchart showing the details of the recovery process executed by the information storage device 10 according to this preferred embodiment.

When the move process shown in FIG. 7 is abnormally terminated, the information storage device 10 starts the recovery process (step S800).

In step S801, the information storage device 10 verifies whether or not the encrypted HD data 33 (hereinafter referred to as data to be moved) for which the move process is to be executed in step S710 is data that can be recovered. Here, the information storage device 10 verifies the legality of the encrypted HD data 33. The information storage device 10 verifies, for example, that the encrypted HD data 33 is not data for which the recovery process has been already executed. If the encrypted HD data 33 is the data for which the recovery process has been already executed, the information storage device 10 determines that the encrypted HD data 33 cannot be recovered, and advances the process to step S802.

Alternatively, if the legality of the encrypted HD data 33 such that the recovery process has not been executed for the encrypted HD data 33, the information storage device 10 determines that the encrypted HD data 33 can be recovered, and advances the process to step S803.

In step S802, the information storage device 10 displays on the output device 24 a message such that this program cannot be moved. Then, the information storage device 10 advances the process to step S819, and terminates the recovery process.

In step S803, the information storage device 10 verifies whether or not a DVD is set in the medium driving device 26. The information storage device 10 also verifies whether or not the set DVD is a DVD compliant with CPRM.

If the DVD is not compliant with CPRM, the information storage device 10 advances the process to step S804. Alternatively, if the DVD is compliant with CPRM, the information storage device 10 advances the process to step S805.

In step S804, the information storage device 10 displays on the output device 24 a message such that this disk is unavailable. Then, the information storage device 10 advances the process to step S819, and terminates the recovery process.

In step S805, the information storage device 10 obtains a medium ID from the BCA of the DVD. Then, in step S806, the information storage device 10 decrypts the data to be moved with the use of the medium ID as a key. Namely, the information storage device 10 restores the program data 12 from the encrypted data to be moved.

Upon completion of decrypting the program data 12, the information storage device 10 advances the process to step S807 to check the sameness of the DVD. Namely, the information storage device 10 verifies whether or not the DVD currently set in the medium driving device 26 is the same as the DVD with the medium ID obtained in step S805. The sameness of the DVD may be checked with a process similar to that of step S708 shown in FIG. 7.

If the information storage device 10 determines in step S807 that the DVD currently set in the medium driving device 26 is not the same as the DVD with the medium ID obtained in step S805, it advances the process to step S808. Then, the information storage device 10 displays on the output device 24 a message such that this disk is unavailable, and terminates the process (step S819).

Alternatively, if the information storage device 10 determines in step S807 that the DVD currently set in the medium driving device 26 is the same as the DVD with the medium ID obtained in step S805, it advances the process to step 809, and initializes the DVD.

Upon completion of initializing the DVD, the information storage device 10 advances the process to step S810. Then, the information storage device 10 displays on the output device 24 a message for prompting a user to replace the disk. When the user sets a new DVD, the information storage device 10 advances the process to step S811.

In step S811, the information storage device 10 verifies whether or not the DVD currently set in the medium driving device 26 is a DVD compliant with CPRM in a similar manner as in step S803. If the DVD is not compliant with CPRM, the information storage device 10 advances the process to step S812. Then, the information storage device 10 displays on the output device 24 a message such that this disk is unavailable, and terminates the process (step S819).

If the DVD is compliant with CPRM in step S811, the information storage device 10 advances the process to step S813. Then, the information storage device 10 obtains a medium ID from the BCA of the DVD.

Upon obtaining the medium ID, the information storage device 10 advances the process to step S814. Then, the information storage device 10 generates encrypted HD data 33 by encrypting the program data 12 with the use of the medium ID obtained in step S813 as a key. Then, the information storage device 10 invisualizes the encrypted HD data 33. The program data 12 stored in the HDD is deleted.

Upon completion of generating the encrypted HD data 33, the information storage device 10 advances the process to step S815. Then, the information storage device 10 reads the encrypted HD data 33 from the HDD, decrypts the read data, and writes the data to the DVD after invisualizing the encrypted HD data 33.

Upon completion of writing the data to the DVD, the information storage device 10 advances the process to step S816.

In step S816, the information storage device 10 verifies whether or not a setting for saving the encrypted HD data 33 stored in the HDD is made, for example, by referencing the memory 22, etc. If the setting for saving the encrypted HD data 33 is made, the information storage device 10 advances the process to step S817, saves the encrypted HD data 33 in a predetermined area (an area that a user cannot operate) of the HDD, and terminates the process (step S819). The encrypted HD data 33 is saved for the recovery process that can possibly occur.

Alternatively, if the setting for saving the encrypted HD data 33 is not made, the information storage device 10 advances the process to step S818, deletes the encrypted HD data 33 from the HDD 33, and terminates the process (step S819).

The above description refers to the case where the whole of the program data 12 is encrypted to generate the encrypted HD data 33 in step S706 of FIG. 7 or in step S814 of FIG. 8. However, only part of the program data 12 may be encrypted.

In this case, the move process executed by the information storage device 10 according to this preferred embodiment shown in FIG. 7 is as follows.

Namely, in step S706 shown in FIG. 7, the information storage device 10 generates check data by encrypting a predetermined area of the program data 12 specified in step S700 with the use of the medium ID obtained in step S705 as a key, and stores the generated data in the HDD.

Upon completion of generating the check data, the information storage device 10 advances the process to step S707. Then, the information storage device 10 invisualizes the program data 12 specified in step S700.

Upon completion of invisualizing the program data 12, the information storage device 10 advances the process to step S708 to check the sameness of the DVD. Namely, the information storage device 10 verifies whether or not the DVD currently set in the medium driving device 26 is the same as the DVD with the medium ID obtained in step S705.

The sameness of the DVD may be checked, for example, as follows.

Initially, the medium ID is obtained from the DVD currently set in the medium driving device 26. Then, whether or not the check data can be decrypted with the use of the medium ID as a key is verified. If the check data can be decrypted, the DVD currently set in the medium driving device 26 is determined to be the same as the DVD with the medium ID obtained in step S705. If the check data cannot be decrypted, the DVD currently set in the medium driving device 26 is determined not to be the same as the DVD with the medium ID obtained in step S705.

If the DVD currently set in the medium driving device 26 is determined to be the same as the DVD with the medium ID obtained in step S705 in step S708, the information storage device 10 advances the process to step S710. Then, the information storage device 10 decrypts the encrypted HD data 33 stored in the HDD, and writes the decrypted data to the DVD.

In the meantime, the recovery process executed by the information storage device 10 according to this preferred embodiment shown in FIG. 8 is as follows.

Namely, upon obtaining a medium ID from the BCA of the DVD in step S805, the information storage device 10 advances the process to step S807 to check the sameness of the DVD. As described above, the sameness of the DVD may be checked by obtaining a medium ID from the DVD currently set in the medium driving device 26, and by verifying whether or not the check data can be decrypted with the use of the medium ID as a key.

If the information storage device 10 determines in step S807 the DVD currently set in the medium driving device 26 to be the same as the DVD with the medium ID obtained in step S805, it advances the process to step S809, and initializes the DVD.

Upon completion of initializing the DVD, the information storage device 10 advances the process to step S810. Then, the information storage device 10 displays on the output device 24 a message for prompting a user to replace the disk. When the user sets a new DVD, the information storage device 10 advances the process to step S811.

If the DVD is compliant with CPRM in step S811, the information storage device 10 advances the process to step S813, and obtains a medium ID from the BCA of the DVD.

Upon obtaining the medium ID, the information storage device 10 advances the process to step S814. Then, the information storage device 10 generates check data by encrypting the predetermined area of the program data 12 with the use of the medium ID obtained in step S813 as a key, and stores the generated data in the HDD.

Upon completion of generating the check data, the information storage device 10 advances the process to step S815. Then, the information storage device 10 reads the program data 12, and writes the data to the DVD after invisualizing the program data 12.

In the above description, the key used for the encryption process in step S706 shown in FIG. 7 or the decryption process in step S806 shown in FIG. 8 is generated, for example, with a medium ID. However, the generation of the key is not limited to this implementation. The key may be generated, for example by using MKB (Media Key Block) stored in a read-in area of a DVD compliant with CRPM, a device key comprised by the information storage device 10, or the like.

As described above, the information storage device 10 according to this preferred embodiment encrypts the whole or part of program data 12 with the use of a medium ID obtained from a DVD as a key. Therefore, the sameness of the DVD can be verified depending on whether or not the encrypted program data 12 can be decrypted with the use of the medium ID obtained from the currently set DVD if the move process is unsuccessfully executed.

Namely, the currently set DVD can be identified as that used when the move process is unsuccessfully executed. This can guarantee that only one reproducible piece of program data 12 exists even if the program data 12 stored in the HDD is restored by initializing the DVD. Namely, it becomes possible to restore the program data 12 stored in the HDD.

What is claimed is:

1. An information storage device that can move data stored on a first storage medium to a second storage medium, comprising:

a data moving unit to encrypt the data stored on the first storage medium with the use of a second medium identifier to identify the second storage medium obtained from the second storage medium, and to move the data from the first storage medium to the second storage medium after making the data unreproducible;

an abnormality detecting unit to detect an abnormal termination of the data moving unit;

a storage medium verifying unit to verify whether a third storage medium is the second storage medium used when the abnormal termination was detected, before moving the data from the first storage medium to the third storage medium upon detection of the abnormal termination of the data moving unit by the abnormality detecting unit, the storage medium verifying unit comprising, a third medium identifier obtaining unit to obtain from the third storage medium a third medium identifier to identify the third storage medium, and a decryption verifying unit to verify whether the third storage medium is the second storage medium used when the abnormality detecting unit detected an abnormal termination by decrypting the data on the first storage medium with the use of the third medium identifier;

a medium initializing unit to initialize the third storage medium when the storage medium verifying unit determines that the third storage medium is the second storage medium used when the abnormal termination was detected; and
a reactivating unit to make the data reproducible upon completion of initializing the third storage medium by the medium initializing unit.

2. The information storage device according to claim 1, wherein
the data moving unit comprises
a second medium identifier obtaining unit to obtain from the second storage medium the second medium identifier to identify the second storage medium,
an invisualizing unit to generate encrypted data by encrypting desired data stored on the first storage medium with the use of the second medium identifier as an encryption key, and to make the encrypted data unreproducible, and
a writing unit to read the encrypted data from the first storage medium, to read the read data with the use of the second medium identifier, and to write the data to the second storage medium.

3. The information storage device according to claim 1, wherein
the data moving unit comprises
a second medium identifier obtaining unit to obtain from the second storage medium the second medium identifier to identify the second storage medium,
an invisualizing unit to generate encrypted data by encrypting part of desired data stored on the first storage medium with the use of the second medium identifier as an encryption key, and to make the data unreproducible, and
a writing unit to read the data from the first storage medium, and to write the read data to the second storage medium.

4. An information storage device having a function to move data stored on a first storage medium to a second storage medium, comprising:
a second medium identifier obtaining unit to obtain from the second storage medium a second medium identifier to identify the second storage medium;
an invisualizing unit to generate encrypted data by encrypting desired data stored on the first storage medium with the use of the second medium identifier as an encryption key, and to make the encrypted data unreproducible;
a writing unit to read the encrypted data from the first storage medium, to decrypt the read data with the use of the second medium identifier, and to write the data to the second storage medium;
an encrypted data deleting unit to delete the encrypted data stored on the first storage medium after completion of the writing;
an abnormality detecting unit to detect an abnormal termination of the writing;
a third medium identifier obtaining unit to obtain from a third storage medium a third medium identifier to identify the third medium;
a decryption verifying unit to verify whether the third storage medium is the second storage medium used when the abnormality detecting unit detected an abnormal termination by decrypting the data on the first storage medium with the use of the third medium identifier;
a medium initializing unit to initialize the third storage medium when the decryption verifying unit determines that the encrypted data can be decrypted with the use of the third medium identifier; and
a reactivating unit to make the decrypted data reproducible by decrypting the encrypted data with the use of the third medium identifier upon completion of initializing the third storage medium by the medium initializing unit.

5. A data moving method for moving data stored on a first storage medium to a second storage medium, which causes an information storage device to execute:
encrypting the data stored on the first storage medium with the use of a second medium identifier to identify the second storage medium obtained from the second storage medium, and moving the data from the first storage medium to the second storage medium after making the data unreproducible;
verifying whether a third storage medium is the second storage medium used when an abnormal termination wasdetected, before moving the data from the first storage medium to the third storage medium upon detection of the abnormal termination of the moving of the data, the verifying comprises obtaining from the third storage medium a third medium identifier to identify the third storage medium, and verifying whether the third storage medium is the second storage medium used when the abnormal termination was detected by decrypting the data on the first storage medium with the use of the third medium identifier;
initializing the third storage medium when the third storage medium is the second storage medium used when the abnormal termination was detected; and
making the data reproducible upon completion of initializing the third storage medium.

6. The data moving method according to claim 5, wherein the moving of the data comprises
obtaining from the second storage medium the second medium identifier to indentify the second storage medium,
generating encrypted data by encrypting desired data stored on the first storage medium with the use of the second medium identifier as an encryption key, and making the encrypted data unreproducible, and
reading the encrypted data from the first storage medium, decrypting the read data with the use of the second medium identifier, and writing the data to the second storage medium.

7. The data moving method according to claim 5, wherein the moving of the data comprises
obtaining from the second storage medium the second medium identifier to identify the second storage medium,
generating encrypted data by encrypting part of desired data stored on the first storage medium with the use of the second medium identifier as an encryption key, and making the data unreproducible, and
reading the data from the first storage medium, and writing the read data to the second storage medium.

8. A computer readable, non-transitory storage medium for data moving program for causing an information storage device to move data stored on a first storage medium to a second storage medium by causing the information storage device to execute:
encrypting the data stored on the first storage medium with the use of a second medium identifier to identify the second storage medium obtained from the second storage medium, and moving the data from the first storage medium to the second storage medium after making the data unreproducible;
verifying whether a third storage medium is the second storage medium used when the abnormal termination was detected, before moving the data from the first storage medium to the third storage medium upon detection of the abnormal termination of the moving of the data, the verifying comprises obtaining from the third storage medium a third medium identifier to identify the third storage medium and verifying whether the third storage medium is the second storage medium used when the abnormal termination was detected by decrypting the data on the first storage medium with the use of the third medium identifier;

initializing the third storage medium when the third storage medium is the second storage medium used when the abnormal termination was detected; and making the data reproducible upon completion of initializing the third storage medium.

9. The storage medium for data moving program according to claim 8, wherein the moving of the data comprises obtaining from the second storage medium the second medium identifier for identifying the second storage medium, generating encrypted data by encrypting desired data stored on the first storage medium with the use of the second medium identifier as an encryption key, and making the encrypted data unreproducible, and reading the encrypted data from the first storage medium, decrypting the read data with the use of the second medium identifier, and writing the data to the second storage medium.

10. The storage medium for data moving program according to claim 8, wherein the moving of the data comprises obtaining from the second storage medium the second medium identifier for identifying the second storage medium, generating encrypted data by encrypting part of desired data stored on the first storage medium with the use of the second medium identifier as an encryption key, and making the data unreproducible, and reading the data from the first storage medium, and writing the read data to the second storage medium.

* * * * *